United States Patent [19]
Lee

[11] Patent Number: 6,084,732
[45] Date of Patent: Jul. 4, 2000

[54] METHOD OF SELECTING ZONE LAY-OUT OF A HARD DISK DRIVE ON BASIS OF HEAD/RECORDING MEDIUM PERFORMANCE

[75] Inventor: Jae-Sung Lee, Seoul, Rep. of Korea

[73] Assignee: SamSung Electronics Co., Ltd., Suwon, Rep. of Korea

[21] Appl. No.: 08/933,339

[22] Filed: Sep. 18, 1997

[30] Foreign Application Priority Data

Sep. 18, 1996 [KR] Rep. of Korea ...................... 96-40656

[51] Int. Cl.$^7$ ....................................................... G11B 5/09
[52] U.S. Cl. ................................. 360/53; 360/48; 360/51
[58] Field of Search ................................. 360/31, 46, 51, 360/53, 48

[56] References Cited

U.S. PATENT DOCUMENTS

| | | |
|---|---|---|
| 5,369,533 | 11/1994 | Ottesen et al. . |
| 5,408,367 | 4/1995 | Emo . |
| 5,537,264 | 7/1996 | Pinteric . |
| 5,596,458 | 1/1997 | Emo et al. ................................. 360/48 |
| 5,600,500 | 2/1997 | Madsene et al. . |
| 5,610,776 | 3/1997 | Oh . |
| 5,870,237 | 2/1999 | Emo et al. ................................. 360/48 |
| 5,946,153 | 8/1999 | Emo et al. ................................. 360/48 |

*Primary Examiner*—Paul Loomis
*Assistant Examiner*—Regina Y. Neal
*Attorney, Agent, or Firm*—Robert E. Bushnell, Esq.

[57] ABSTRACT

A method of selecting a zone lay-out of a hard disk drive on the basis of head/recording medium performance, which method includes (a) setting a reference position of each of the magnetic heads to measure the head performance, and a reference value of the head performance at the reference position; (b) making a disk drive by selecting a zone lay-out corresponding to the reference value of the head performance; (c) measuring an error rate of all zones of the disk drive by using the selected zone lay-out; and (d) when the measured error rate does not satisfy the reference value, selecting another zone lay-out of another disk drive of lower capacity, and performing the next test on that disk drive.

14 Claims, 3 Drawing Sheets

CAPACITY : A DRIVE; B DRIVE; C DRIVE

RW FREG0 > RW FREG9

METHOD OF SELECTING ZONE LAY-OUT OF A HARD DISK DRIVE ON BASIS OF HEAD/RECORDING MEDIUM PERFORMANCE

CLAIM FOR PRIORITY

This application makes reference to, incorporates the same herein, and claims all benefits accruing under 35 U.S.C. §119 from an application for METHOD OF SELECTING ZONE LAY-OUT OF A HARD DISK DRIVE ON THE BASIS OF HEAD/RECORDING MEDIUM PERFORMANCE earlier filed in the Korean Industrial Property Office on the Sep. 18, 1996, and there duly assigned Serial No. 40656/1996, a copy of which application is annexed hereto.

BACKGROUND OF THE INVENTION

1. Technical Field

The present invention generally relates to a hard disk drive, and more particularly, relates to a method of selecting a zone lay-out of a hard disk drive using zone-bit recording.

2. Related Art

Transducer head and recording media are the most important components of a hard disk drive, and the quality of hard disk drives depends on the head performance. In general, at least four heads are provided for each hard disk drive. These heads meet the basic head specifications, and there is little difference in the performance of each of the heads. This results from a change in load force during head stack swaging or a warping created when joining its base plate and cover together during the manufacture of hard disk drive. There is a little difference in the heights of the flying heads, which may affect the head performance. Generally, fifty or sixty of every one hundred hard disk drives contain magnetic heads that satisfy the head specifications, and the remainder of disk drives may have one or two heads of low performance. The disk drives with one or two heads of low performance fail to satisfy the system's error rate specifications, and as a result, they are considered to be inferior products. High-capacity hard disk drives with four heads may experience this problem as well.

Transducer heads that are defective during the manufacturing process should be replaced with new ones through reprocessing. However, since a typical defective head is firmly joined to a head stack by ball swaging, any replacement effort of only the defective head can be complicated and laborious. For this reason, the entire head stack containing a defective head must be replaced with a new one, and the heads of good quality must be discarded together with the defective head. I have observed that this requirement lowers the productivity and increases the production cost of a head assembly. Accordingly, an alternative means to retain a valuable head stack containing some defective heads can be still contemplated.

SUMMARY OF THE INVENTION

Accordingly, it is an object of the present invention to provide a method of effectively using a valuable head stack containing some defective heads without costly replacement.

It is also an object to provide a method of making a hard disk drive, having some defective magnetic heads, satisfy its basic error rate specifications without replacing the whole head stack with a new one.

These and other objects of the present invention can be achieved by a method of selecting a zone lay-out of a hard disk drive on the basis of head/recording medium performance, which include the steps of (a) setting a reference position of each of the magnetic heads to measure the head performance, and a reference value of the head performance at this reference position; (b) making a drive by selecting a zone lay-out corresponding to the reference value of the head performance; (c) measuring an error rate of all of the zones of the drive by using the selected zone lay-out; and (d) when the measured error rate does not satisfy the reference value, selecting another drive's zone lay-out of lower capacity and performing a subsequent test on the drive.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Generally, when a read/write data frequency of a magnetic head is decreased, a large read/write margin can be assured in order to enhance the head performance. In this case, a disk drive does not have the desired capacity, but the entire head stack need not be unnecessarily replaced with a new one because it is simple to decrease a magnetic head's read/write data frequency. Therefore, even if some magnetic heads forming a head stack are defective, the entire head stack need not be replaced in order to minimize the production costs. For example, if the desired capacity of a hard disk drive is 1 Giga byte (GB) and there is a head failure, a decrease of the data frequency by 20% makes the hard disk drive have a capacity of 820 Mega byte (MB). When decreasing the data frequency by 30%, the drive capacity becomes 710 MB. The 20%- or 30%-reduction of the drive capacity enables the read/write error margin to be increased by 20% or 30%, thereby enhancing the head performance.

According to the preferred embodiment of the present invention, three zone lay-outs for the respective 1 GB, 820 MB, and 710 MB hard disk drives are set in the drive firmware.

Figure 1:
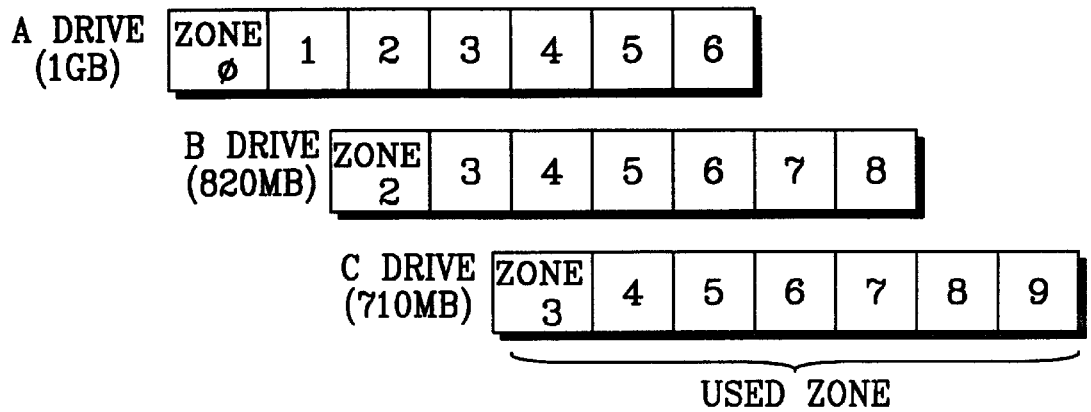
FIG. 1 is a block diagram of zone lay-outs for respective 1 GB, 820 MB, and 710 MB drives according to the principles of the present invention.

Referring now to the drawings, FIG. 1 is a block diagram of zone lay-outs for the respective 1 GB, 810 MB, and 710 MB drives according to the principles of the present invention. As shown in FIG. 1, 1 GB drive A, 820 MB drive B, and 710 MB drive C use high, intermediate, and low-frequency, zones, respectively, according to its own head/ recording medium characteristics, performance of each of read/write channel chips, interface controllers, etc. Each zone is intended to contain its size, a read/write channel set value for operating at the corresponding read/write and data frequency, a sector pulse generating time, data field spilt information, and to secure the number of sectors required for achieving the corresponding capacity.

Figure 2:
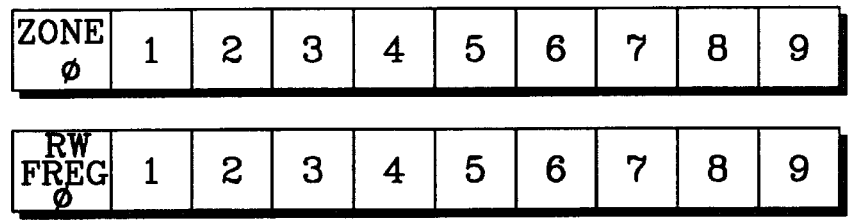
FIG. 2 illustrates zones and the read/write data frequencies in accordance with the present invention.
Figure 3:
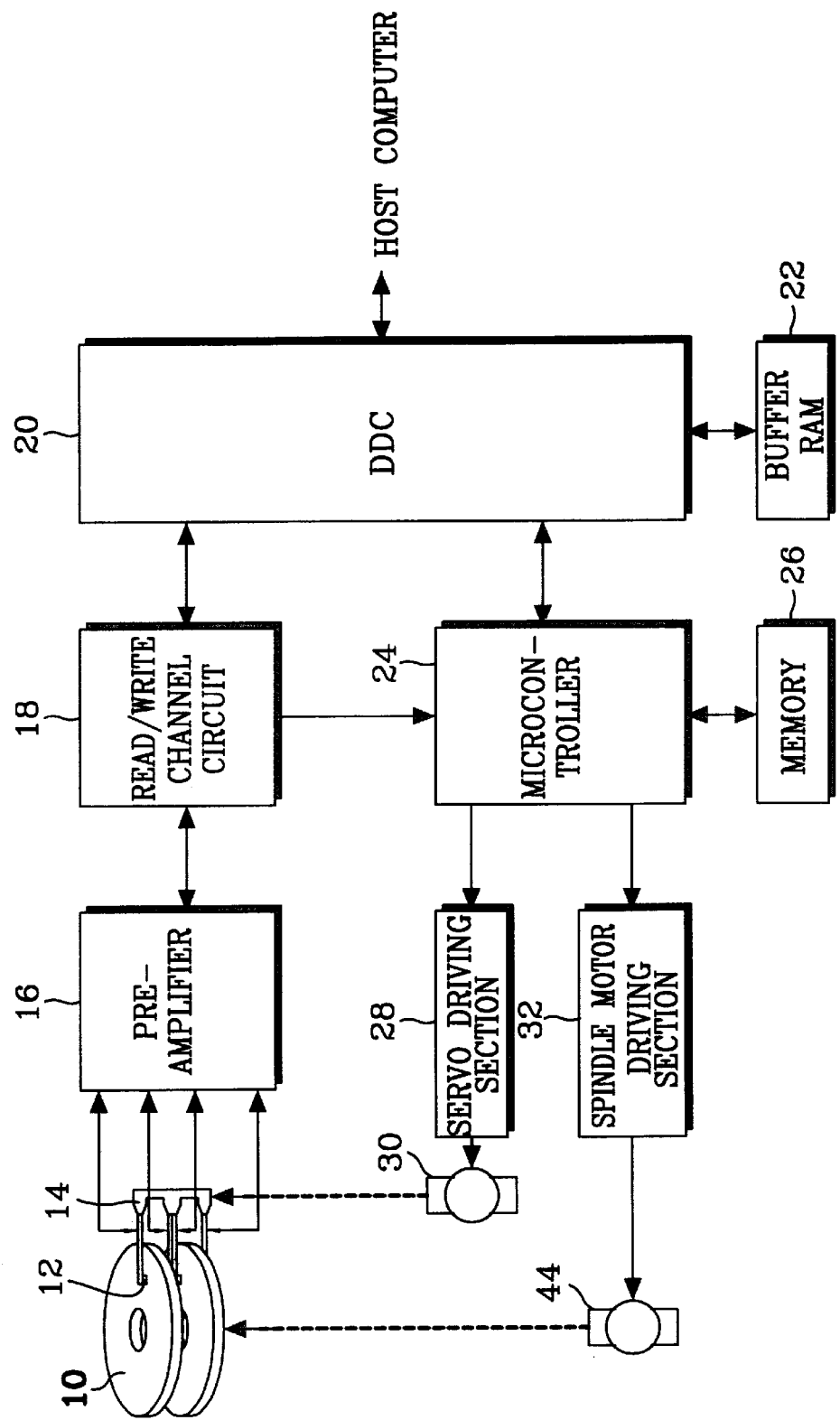
FIG. 3 is a block diagram of a hard disk drive constructed according to the principles of the present invention.

FIG. 2 illustrates zones and their read/write data frequencies in accordance with the present invention, and FIG. 3 illustrates a hard disk drive constructed according to the principles of the present invention. As shown in FIG. 3, the disk drive includes magnetic disks 10, a transducer head assembly 14 of an E-shape and having actuator arms, each for supporting a respective transducer head 12, a preamplifier 16, a read/write channel circuit 18, a disk data controller (DDC) 20, a buffer random-access-memory (RAM) 22, a micro-controller 24, a read-only-memory (ROM) 26, a servo driving section 28 for driving a voice coil actuator 30, and a spindle motor driving section 32 for driving a spindle motor 44.

Preamplifier 16 is electrically connected to transducer head assembly 14 for amplifying a predetermined signal read out from the disk 10 using the transducer head 12, and for transmitting the amplified signal to the read/write channel circuit 18. For the purpose of writing data onto the disk 10, the preamplifier 16 applies encoded writing data transmitted from the read/write channel circuit 18 to a designated transducer head 12, selected from all available transducer heads, to be recorded on the disk 10. In this regard, the preamplifier 16 selects one of the transducer heads 12 according to a control signal generated from disk data controller (DDC) 20 under the instruction of micro-controller 24.

Read/write channel circuit 18 is connected between the preamplifier 16 and the DDC 20 for decoding data pulses from a read signal received from pre-amplifier 16 to generate read-out data, and for decoding write data received from DDC 20 to transmit the decoded write data to the preamplifier 16. DDC 20, which is interfaced between a host computer and micro-controller 24, writes data received from the host computer on a disk 10 through the read/write channel circuit 18 and preamplifier 16, or reads data from the disk and transmits the same to the host computer under control of the micro-controller 24. A buffer RAM 22 temporarily stores data transmitted between the host computer, micro-controller 24, and read/write channel circuit 18. Micro-controller 24 controls DDC 20 in response to read or write commands received from the host computer, and controls track seeking and following operations. ROM 26 stores the system control program used by micro-controller 24 and various set points. According to a signal which is generated by micro-controller 24 for controlling the position of head 12, servo driving section 28 generates current for moving the actuator and applies the current to VCM motor 30. VCM motor 30 moves head 12 attached to the actuator over disk 10 corresponding to the direction and level of the current applied by the servo driving unit 28. A spindle motor driving unit 32 operates a spindle motor 34 which rotates disk 10 according to a value generated by micro-controller 24 for controlling the rotation of the disk 10. A disk signal control unit (not shown) generates various kinds of timing signals necessary to read and write, and sends servo information to the micro-controller 24 after decoding the information.

Figure 4:
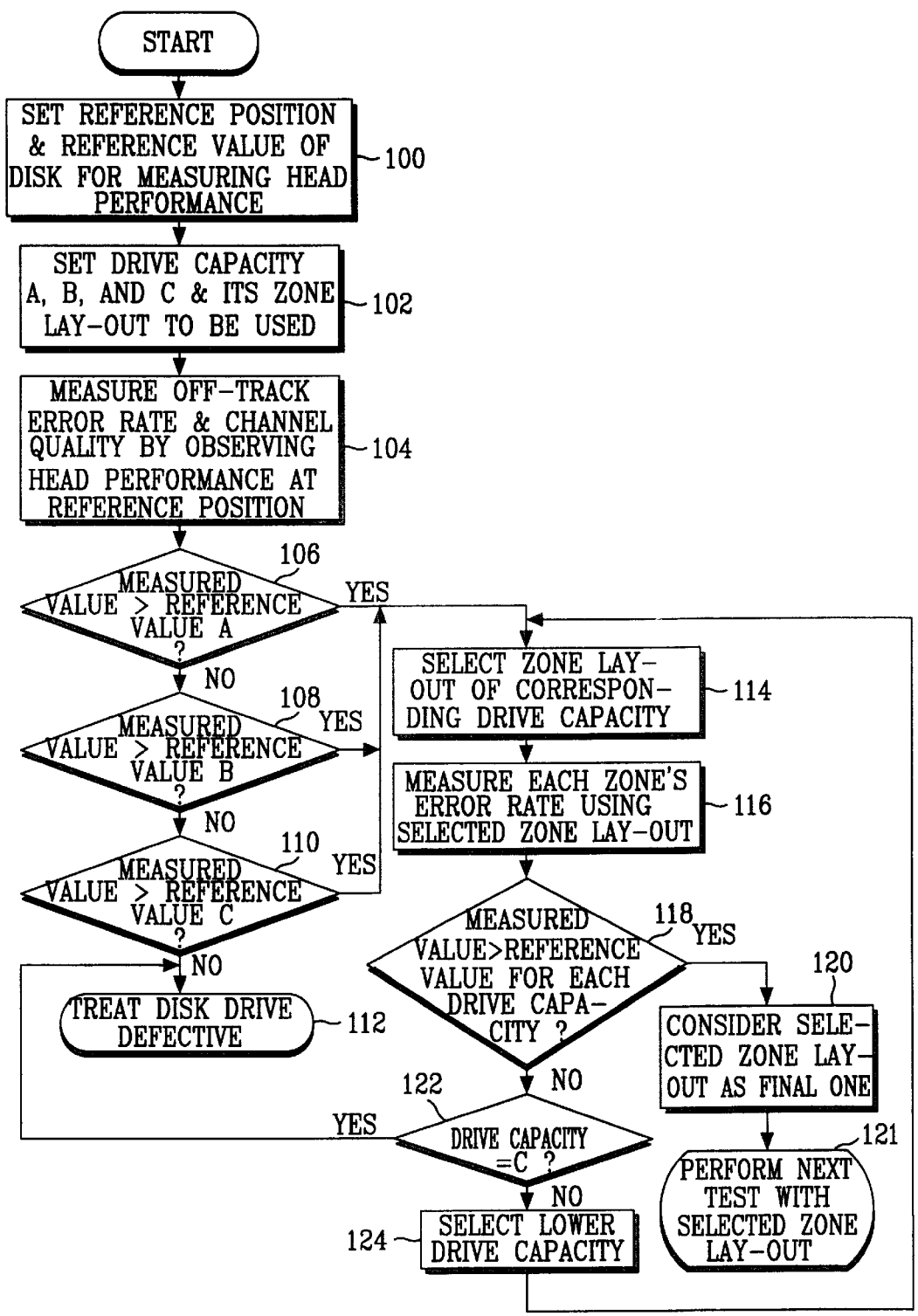
FIG. 4 is a flow chart of a control sequence of selecting a zone lay-out of a hard disk drive on the basis of the head performance according to the principles of the present invention.

Referring to FIGS. 3 and 4, a method of selecting a zone lay-out of a hard disk drive on the basis of the head performance according to the principles of the present invention will now be described in detail hereinbelow.

Micro-controller 24 sets, at step 100, a reference position of a disk to measure the performance of each of the heads, and a reference value of the head performance (channel quality, off-track error rate, etc.) at this reference position. For example, if the reference position is cylinder number 1000, each reference value of the off-track error rate at this reference position is $10^{-10}$ for 1 GM drive A, $10^{-9}$ for 820 MB drive B, and $10^{-8}$ for 710 MB drive C. Micro-controller 24 sets, at step 102, a drive capacity and its zone lay-out to be used. Micro-controller 24 observes the head performance at the reference position and measures data. If the measured data is higher than $10^{-10}$, the reference value of the off-track error rate for 1 GM drive A, the micro-controller 24 selects, at steps 106 and 114, 1 GB drive A's zone lay-out.

Alternatively, if the measured data is higher than $10^{-9}$ or $10^{-8}$, the micro-controller 24 selects the 820 MB drive B's zone lay-out, at steps 108 and 114, or sets 710 MB drive C's zone lay-out, at steps 110 and 114. However, if the measured data is smaller than $10^{-10}$, $10^{-9}$ and $10^{-8}$, micro-controller 24 treats the disk drive as defective at step 112. At step 116, the micro-controller 24 measures the channel quality and error rates with respect to all the zones of the drive by using the selected zone lay-out, and determines if the measured value is higher than the reference values for the drives A, B and C at step 118. When the measured value is higher than the reference values for the drives A, B and C, micro-controller 24 considers that the selected drive's zone lay-out is a final one at step 120, and performs a subsequent test with the selected zone lay-out at step 121.

When the measured value is not higher than the respective reference values for the drives A, B and C, however, the micro-controller 24 selects another drive's zone lay-out lower in capacity than the selected one, and tests, the drive at steps 122 and 124 by using the selected zone lay-out. The above-described operation is repeated until the lowest-capacity drive is tested, and if the measured value is not higher than the reference value for the lowest-capacity drive at step S122, the micro-controller 24 treats the disk drive as defective, at step 112 and performs another reprocessing, such as head stack replacement.

As described above, the present invention advantageously permits a hard disk drive with defective heads to have a different capacity through a simple process, without replacing a head stack having defective heads with a new one. A large read/write margin can be assured by lowering a magnetic head's read/write data frequency so that the head performance is enhanced and more reliable hard disk drives can be manufactured.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A method of selecting a zone lay-out of a hard disk drive having magnetic heads on the basis of head/recording medium performance, said method comprising the steps of:

(a) setting a reference position of each of the magnetic heads to measure the head performance, and a reference value of the head performance at the reference position;

(b) establishing a disk drive by selecting a zone lay-out corresponding to the reference value of the head performance;

(c) measuring an error rate of all zones of the hard disk drive by using the selected zone lay-out; and (d) when the measured error rate does not satisfy said reference value, selecting another zone lay-out of another disk drive of lower capacity, and performing a next test on said another disk drive.

2. The method of claim 1, further comprising repeating steps (c) and (d) until a disk drive of lowest capacity is tested in step (d).

3. The method of claim 1, wherein the head performance relates to head quality and an off-track error rate at the reference position.

4. The method of claim 2, further comprising the step of determining the hard disk drive to be defective when the measured error rate does not satisfy said reference value for all selected lay-outs of all disk drives of lower capacity including the disk drive of lowest capacity.

5. The method of claim 1, wherein a large read/write margin for the hard disk drive is assured by lowering a read/write frequency of the magnetic heads, thereby enhancing the head performance.

6. A method of selecting a zone lay-out of a hard disk drive on the basis of head performance thereof, said method comprising the steps of:

setting a reference position and a reference value for measuring the head performance;

setting a plurality of drive capacities and respective zone lay-outs of said drive capacities;

measuring a performance parameter by observing the head performance at the reference position;

comparing the measured performance parameter to a first reference value for a first drive capacity;

when the measured performance parameter is greater than the first reference value, selecting the zone lay-out of corresponding said first drive capacity, and measuring an error rate for each zone using the selected zone lay-out; and when the measured performance parameter is not greater than the first reference value, comparing the performance parameter to a second reference value corresponding to a second drive capacity.

7. The method of claim 6, further comprising the step of treating the disk drive as defective when the measured performance parameter is not greater than the second reference value.

8. The method of claim 6, further comprising the step, after measuring the error rate for each zone using the selected zone lay-out, of comparing the measured error rate with a reference value for each drive capacity.

9. The method of claim 8, further comprising the step, when the measured error rate is greater than the reference value for each drive capacity, of considering the selected zone lay-out as the final zone lay-out.

10. The method of claim 9, further comprising the step, after the step of considering the selected zone lay-out as the final zone lay-out, of performing a subsequent test with the selected zone lay-out.

11. The method of claim 8, further comprising the step, when the measured error rate is not greater the reference value for each drive capacity, of determining whether the measured error rate has been compared to the reference value for all drive capacities.

12. The method of claim 11, further comprising the step, when it is determined that the measured error rate has not been compared to the reference value for all drive capacities, of selecting a lower drive capacity.

13. The method of claim 12, further comprising the step, after the step of selecting a lower drive capacity, of selecting the zone lay-out corresponding to said selected lower drive capacity, and measuring an error rate for each zone using the selected zone lay-out corresponding to said selected lower drive capacity.

14. The method of claim 11, further comprising the step, when it is determined that the measured error rate has been compared to the reference value for all drive capacities, of treating the disk drive as defective.

* * * * *